United States Patent
Ekambaram et al.

(10) Patent No.: US 10,198,597 B2
(45) Date of Patent: Feb. 5, 2019

(54) MANAGING MOBILE APPLICATION SECURITY

(71) Applicant: International Business Machines Corporation, Armonk, NY (US)

(72) Inventors: Vijay Ekambaram, Chennai (IN); Nitin Gupta, Saharanpur (IN); Vikas Joshi, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 153 days.

(21) Appl. No.: 15/167,352

(22) Filed: May 27, 2016

(65) Prior Publication Data

US 2017/0344750 A1 Nov. 30, 2017

(51) Int. Cl.
*G06F 21/62* (2013.01)
*G06F 21/45* (2013.01)
*G06F 21/57* (2013.01)

(52) U.S. Cl.
CPC ............ *G06F 21/629* (2013.01); *G06F 21/45* (2013.01); *G06F 21/57* (2013.01); *G06F 2221/033* (2013.01)

(58) Field of Classification Search
CPC ......... G06F 21/629; G06F 21/45; G06F 21/17
See application file for complete search history.

(56) References Cited

U.S. PATENT DOCUMENTS

| | | | | |
|---|---|---|---|---|
| 8,042,061 | B1* | 10/2011 | Stotts | G06F 21/629 715/714 |
| 8,713,684 | B2* | 4/2014 | Bettini | G06F 21/57 726/1 |
| 9,626,515 | B2* | 4/2017 | Wang | G06F 21/577 |
| 9,665,709 | B2* | 5/2017 | Udani | G06F 21/51 |
| 9,811,679 | B2* | 11/2017 | Liu | G06F 21/6218 |
| 9,824,210 | B2* | 11/2017 | Antonelli | G06F 21/604 |
| 9,934,384 | B2* | 4/2018 | Johansson | H04L 63/1433 |
| 2012/0072991 | A1* | 3/2012 | Belani | H04W 12/02 726/25 |
| 2012/0079598 | A1* | 3/2012 | Brock | G06F 21/577 726/25 |

(Continued)

OTHER PUBLICATIONS

Marian Harbach et al., "Using Personal Examples to Improve Risk Communication for Security and Privacy Decisions", CHI 2014, Apr. 26-May 1, 2014, Toronto, ON, Canada, 10 pages, ACM Digital Library.

(Continued)

*Primary Examiner* — Chau Le
(74) *Attorney, Agent, or Firm* — Ference & Associates LLC

(57) ABSTRACT

One embodiment provides a method, the method including: utilizing at least one processor to execute computer code that performs the steps of: identifying one or more access permissions of an application associated with an electronic device; identifying, based on the access permissions, information accessible to the application; analyzing user information within with the accessible information; determining, based on the analyzing, at least one personal exposure risk; and providing to a user, based on the at least one information exposure risk, at least one proposed solution. Other aspects are described and claimed.

20 Claims, 3 Drawing Sheets

(56) References Cited

U.S. PATENT DOCUMENTS

| | | | |
|---|---|---|---|
| 2013/0290709 A1 | 10/2013 | Muppidi et al. | |
| 2014/0142988 A1* | 5/2014 | Grosso | G06Q 10/10 |
| | | | 705/4 |
| 2014/0214610 A1* | 7/2014 | Moshir | G06Q 20/4016 |
| | | | 705/26.35 |
| 2015/0118992 A1* | 4/2015 | Wyatt | H04W 12/08 |
| | | | 455/410 |
| 2015/0237065 A1* | 8/2015 | Roytman | H04L 63/1433 |
| | | | 726/25 |
| 2015/0271207 A1* | 9/2015 | Jaiswal | H04L 63/20 |
| | | | 726/1 |

OTHER PUBLICATIONS

Almuhimedi, Hazim et al., "Your Location has been Shared 5,398 Times!", A Field Study on Mobile App Privacy Nudging, CMU-ISR-14-116, Dec. 2014, 25 pages, School of Computer Science, Carnegie Mellon University, Pittsburgh, PA, USA.

Balebako, Rebecca et al., "Little Brothers Watching You: Raising Awareness of Data Leaks on Smartphones", Symposium on Usable Privacy and Security (SOUPS), Jul. 24-26, 2013, Newcastle, UK, 14 pages.

Hornyack, Peter et al., "These Aren't the Droids You're Looking for", Proceedings of the 18th ACM conference on Computer and Communications Security (CCS '11), 2011, New York, NY, USA, Accessed on Apr. 15, 2016, 14 pages, ACM Digital Library.

Permission Manager, Android Apps on Google Play, 4 pages, Accessed on Apr. 4, 2016, Copy available at: https://play.google.com/store/apps/details?id=com.appaholics.applauncher&hl=en.

Advanced Permission Manager, Android Apps on Google Play, 4 pages, Accessed on Apr. 4, 2016, Copy available at: https://play.google.com/store/apps/details?id=com.gmail.heagoo.pmaster&hl=en.

APK Permission Remover, Android Apps on Google Play, 4 pages, Accessed on Apr. 4, 2016, Copy available at: https://play.google.com/store/apps/details?id=com.gmail.heagoo.apkpermremover&hl=en.

Jung, Jaeyeon et al., "Short Paper: Enhancing Mobile Application Permissions with Runtime Feedback and Constraints", SPSM '12, Oct. 19, 2012, Raleigh, North Carolina, USA, 6 pages, ACM Digital Library.

Boyles, Jan Lauren et al., "Privacy and Data Management on Mobile Devices", Pew Research Center, Internet, Science & Tech, Sep. 5, 2012, 4 pages, Assessed on Apr. 4, 2016, Copy available at: http://www.pewinternet.org/2012/09/05/privacy-and-data-management-on-mobile-devices/.

Felt, Adrienne Porter et al., "Android Permissions: User Attention, Comprehension, and Behavior", Technical Report No. UCB/EECS-2012-26, Feb. 17, 2012, 16 pages, Electrical Engineering and Computer Sciences, University of California Berkeley.

[ROOT] X Privacy Installer, Android Apps on Google Play, 3 pages, Accessed on Apr. 4, 2016, Copy available at: https://play.google.com/store/apps/details?id=biz.bokhorst.xprivacy.installer&hl=en.

Permission Explorer, Android Apps on Google Play, 3 pages, Accessed on Apr. 4, 2016, Copy available at: https://play.google.com/store/apps/details?id=com.carlocriniti.android.permission_explorer&hl=en.

Gorla, Alessandra et al., "Checking App Behavior Against App Descriptions", ICSE '14, May 31-Jun. 7, 2014, Hyderabad, India, 11 pages, ACM Digital Library.

Avdiienko, Vitalii et al., "Mining Apps for Abnormal Usage of Sensitive Data", 2015 IEEE/ACM 37th IEEE International Conference on Software Engineering, 2015, 11 pages, IEEE Digital Library.

\* cited by examiner

US 10,198,597 B2

MANAGING MOBILE APPLICATION SECURITY

BACKGROUND

Mobile Electronic devices (e.g., smart phones, tablets, etc.) are more common today than ever before. As the capability of these devices has increased, so has their role in our lives. Actions that would have previously been carried out only on a computer, such as banking, shopping, gaming, etc., are now done on mobile devices. Because of this increased capability, mobile devices are being granted access to more important and confidential information than ever before. For example, many individuals access his or her bank account via their mobile devices, and perhaps even save his or her credentials locally on the mobile device.

In order to perform these tasks, a user typically has to install various applications on his or her device. This can create a problem in that many of the applications that make mobile devices so convenient require a great deal of permissions in order to function properly. Most applications and application stores (e.g., Google Play, etc.) require that applications disclose which permissions they require. However, this can lead to users becoming overwhelmed with the information and thus simply ignoring or disregarding it. Furthermore, in many instances a user is likely unaware of how much information he or she is providing via the permissions. It can be difficult for a typical user to understand the staggering amount of information an electronic device may know about them.

BRIEF SUMMARY

In summary, one aspect of the invention provides a method comprising: utilizing at least one processor to execute computer code that performs the steps of: identifying one or more access permissions of an application associated with an electronic device; identifying, based on the access permissions, information accessible to the application; analyzing user information within with the accessible information; determining, based on the analyzing, at least one personal exposure risk; and providing to a user, based on the at least one information exposure risk, at least one proposed solution.

Another aspect of the invention provides an apparatus comprising: at least one processor; and a computer readable storage medium having computer readable program code embodied therewith and executable by the at least one processor, the computer readable program code comprising: computer readable program code that identifies one or more access permissions of an application installed on an electronic device; computer readable program code that identifies, based on the access permissions, information accessible to the application; computer readable program code that analyzes user information within with the accessible information; computer readable program code that determines, based on the analyzing, at least one personal exposure risk; and computer readable program code that provides to a user, based on the at least one information exposure risk, at least one proposed solution.

An additional aspect of the invention provides a computer program product comprising: a computer readable storage medium having computer readable program code embodied therewith, the computer readable program code comprising: computer readable program code that identifies one or more access permissions of an application installed on an electronic device; computer readable program code that identifies, based on the access permissions, information accessible to the application; computer readable program code that analyzes user information within with the accessible information; computer readable program code that determines, based on the analyzing, at least one personal exposure risk; and computer readable program code that provides to a user, based on the at least one information exposure risk, at least one proposed solution.

A further aspect of the invention provides a method comprising: identifying at least two applications installed on an electronic device that share a commonality; identifying access permissions of the at least two applications; determining, based on the permissions of the at least two applications, at least one information exposure risk; and providing to a user, based on the at least one information exposure risk, at least one proposed solution.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
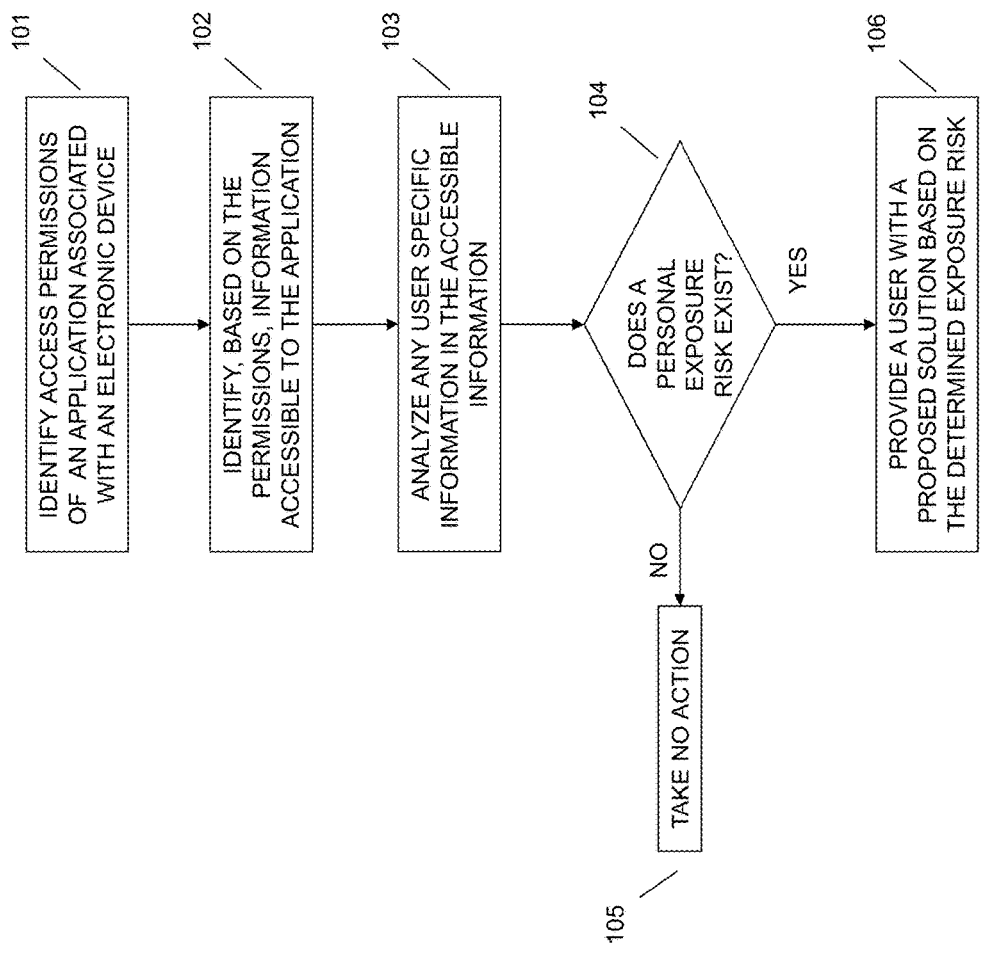
FIG. 1 illustrates an example method of managing mobile application security.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

As discussed herein, electronic devices are regularly used for accessing sensitive or personal information. Specifically, financial or personal information about a user or user's family and friends (e.g., the device owner or device owner's contacts). Thus, device security is, and should be, a high priority for users. Although most applications disclose to a user what permissions they require, it is rarely clear to a user exactly what specific information an application may have access to. This is mostly due to the fact that users store a great deal of information on their devices that they are either unaware of, or simply are not cognizant of. Over time, a user is likely to forget how much personal information they have shared with his or her device.

For example, an application may inform a user that it needs access to such components as: calendar, contacts, location, short message service (SMS), Wi-Fi, etc. Although this may seem fairly common place and perhaps trivial, access to this information allows an application to scrap, collect, and infer very specific details about a user. For example, an application with access to contacts, location, and SMS may be able to determine: salary, age, relationship status, work location, favorite restaurants, hobbies, relationship status with specific contacts, and the like. It is likely that a user would consider that information extremely personal. Moreover, if an application requested such information from a user directly, it is unlikely that the user would grant that access. However, without knowing exactly how much information is stored on his or her devices, users are typically unaware of how detailed the information collected can be.

Throughout the disclosure, the term permissions or application permissions may be used interchangeably. The possible permissions accessible to an application may be subject to change, and across an entire device, the permissions may be constantly in flux. As more complex devices come online, more complex means of information collection become available, and thus more potential permissions. For purposes of clarity, a non-exhaustive example list of application permissions may be, for example: modify or delete storage contents, phone status, identity, precise location, Wi-Fi connections, approximate location, device accounts, microphone, camera, contacts, call log, SMS messages, wearable sensors, data, calendar, etc. It should be understood by one skilled in the art that this is a non-limiting example of potential permissions, and that any permission type known currently or in the future may be applicable to the discussion herein.

Accordingly, an embodiment provides a method that identifies one or more access permissions requested by an application (e.g., location, calendar, contacts, etc.). Based on the permissions requested, an embodiment then identifies user specific information that is available to the application (e.g., text contained in a text message, contact title, etc.). The user specific information is then analyzed and examined as a whole to allow an embodiment to infer what personal information may be available to the application. An embodiment then provides a user with at least one proposed solution to eliminate or reduce the potential exposure risk. Such a system provides a technical improvement over current systems for ensuring personal information security in an unobtrusive and precise manner.

Figure 2:
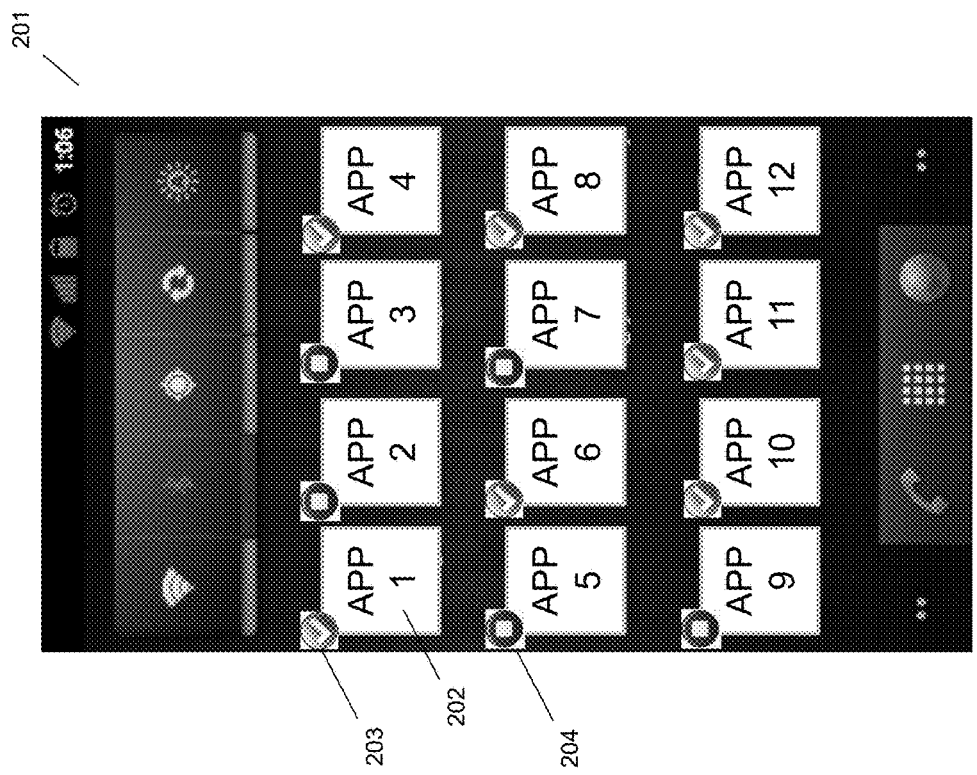
FIG. 2 illustrates an example visual representation of safe and non-safe applications.

Turning now to FIG. 1, an embodiment may identify access permissions of an application associated with an electronic device at 101. Generally, this is done for each application installed on an electronic device as a matter of disclosure to a user. For example, when a user attempts to install an application, they generally have to review a list of requested permissions from the application and approve of the request prior to installation of the application.

Generally, the permissions requested are required for an application to function properly. Without access to the resources it needs, an application may not install properly/completely or may not install at all. Even if a user is able to review and select his or her approved permissions piecemeal, it is likely that the application will lose some of its functionally, or modes of operation. Thus, users generally view the permissions request page as a formality, similar to the long terms and conditions associated with service contracts or computer software.

Once the information is collected, an embodiment may identify information accessible to the application at 102. Thus, once an embodiment learns what an installed or potentially installed application will have access to, it can review any and all user specific information associated with those permissions. For example, if an application has access to a user's text messages, an embodiment may parse all currently stored SMS messages that may contain confidential information that the user has forgotten about or misplaced. This method of collecting/reviewing user centric information allows an embodiment to determine with fine detail what exactly is being disclosed by a user when granting broad access permissions.

In order to determine potential exposure risks, an embodiment may analyze the user specific information at 103. The complexity of the analyzation process may be dependent on the number of permissions granted to an application. For example, if an application only has access to a single permission (e.g., calendar), it may be a rather simple task to scan and analyze that single permission (e.g., determine if any confidential information is contained within the user's personal/work calendar).

Alternatively, if an application requires a great deal of permissions (e.g. calendar, SMS, email, location, contacts, etc.), an embodiment will need to analyze not only each permission itself, but also potential information that can be gathered or inferred based on cross referencing information obtained via additional permissions. For example, if an application has access to a user's contacts, it may know the name of the user's significant other. Combining that knowledge with a calendar entry which lists the user's significant other's name (e.g., dinner with [name], [name]'s birthday) can lead to an inference relating to activities of other specific individuals. An embodiment may determine that the application would have access to personal information about the user's significant other, which the user may not have meant to share.

Once the analyzation step at 103 is complete, an embodiment may determine if a personal exposure risk exists at 104. As discussed herein, the analyzing takes into account all of the user specific information potentially accessible via the application. Thus, an embodiment may draw an inference as to how an application or business might combine or use the accessible information to gather data. The determination at 104 may also be based on a variety of other factors. For example, a device may have a predetermined privacy level which enables an embodiment to determine how much information exposure is too much on a per application basis.

In one embodiment, the predefined privacy level may be determined based on a user preference. By way of example, a user may be able to set a global security level (e.g., high security, medium security, low security, etc.) regarding the device. An embodiment may then, based on the user preference, adjust the determination as to whether the information exposure risk is sufficient enough to warrant action. Additionally or alternatively, the privacy level may be determined based on a system setting within the electronic device itself. By way of non-limiting example, a particular electronic device may be marketed as a highly secure device. Thus, an embodiment may have a system setting (e.g., a setting determined by an original equipment manufacturer (OEM)) that sets the privacy level. An additional example may be that of a large corporation setting, wherein the information technology (IT) department is in charge of maintaining and monitoring many devices. In this situation, an embodiment may determine privacy level settings from a third party application, operating system (OS), or system configuration determined by the IT department.

Once an embodiment had been assigned or identified a desired privacy level it can make the determination regarding the existence of an exposure risk at 104. If there is no exposure risk, or the risk is determined to be below a predetermined privacy threshold no action may be taken at 105. Thus, if no action is taken, the application is allowed to completely install or, in the case of an application already installed, function properly.

Alternatively, if an embodiment determines that a personal exposure risk does exist, a proposed solution may be presented to the user to mitigate the potential for personal information leakage at 106. There are various ways an embodiment may propose for a user to address a potential exposure. One embodiment may rely on various factors in making a determination as to which solution method to propose. For example, the determined solution may be based on one or more of: the type of information at risk, user preferences, system settings, and the privacy level discussed herein.

In one embodiment, the proposed solution at 106 may be to cancel an application installation. This solution is possible because, in an embodiment, real-time protection is operational on a user device. Thus, when a user selects an application to be installed, an embodiment may perform the steps outlined herein (e.g., 101, 102, 103 and 104) for each application installation request.

Additionally or alternatively, an embodiment may propose a solution that, for example, modifies the application installation. In order to modify an application installation, an embodiment may restrict a subset of the application installation sequence, or only allow a subset of the total functions within the application to execute. For example, if an application requests user location position, an embodiment may allow the installation, but restrict the application's access to location information. By doing this, an embodiment may allow the primary functions of the application (e.g., ordering a pizza), while still restricting access to location information. Although access to a user's location information may increase the usefulness of the application (e.g., determining a delivery address) it is not required and thus the application may still function properly.

In a further embodiment, the proposed solution may involve modifying user specific personal information. By way of non-limiting example, this may involve modifying a contact name or alias. For example, a user may have his or her mother or father saved in their contacts as "Mom" and/or "Dad." Thus, an application can infer that a particular phone number, email address, physical address, etc. is associated with a user's parents. Based on this information, an application can infer additional details about a user's parents.

For example, if an application has access to a user's email or text messages, it may be able to gather personal information associated with a specific contact (e.g., medical history, salary, etc.) and based on the contact label (e.g., "mom") determine that the contact is the user's parent. Although this is a simplified example, it should be understood that the connections and inference an application can make could be extremely detailed and thus dangerous to a person's privacy as well as the privacy of those close to them.

Based on the above example, an embodiment may prompt a user to change a contact name from "Mom" to his or her mother's actual name. This action may reduce the chance of an application discovering a user's relationship status, and thus reduce the possibility of an application using information associated with a user's mother in an unintended manner. A further embodiment may recommend specific communications with certain contacts be edited. For example, a user may have text alerts set up to notify him or her of deposits into their checking account. If the notifications include the deposit amount, an application with access to the SMS messages may be able to infer, based on the regularity of the messages, that the deposit is the user's paycheck. Based on that, an application could easily calculate a user's salary. Thus, an embodiment may recommend to a user to delete those messages or remove the dollar value information from the messages.

In a further example, the user may have a document saved on his or her mobile device (e.g., an offer letter for a job), which contains confidential information (e.g., salary information). An embodiment may then recommend to a user to delete or modify the text of the document (e.g., delete the salary value). It should be understood that these are non-limiting examples, and that any source of confidential information may be identified by an embodiment and subsequently recommended for modification.

In a further embodiment, the proposed solution at 106 may be even more advanced. By way of example, an embodiment may suggest entering decoy information regarding a document or contact. Thus, not only would an application have less information on which to base its inferences, it would also have some false positives. False positives may be more advantages overall when dealing with a software algorithm designed for data collection, compared to simple omission or deletion.

The determination of an exposure risk may be done on an application by application basis (e.g., when the application is to be installed), or across the entirety of the device. Another embodiment may operate in the background of the device monitoring in real-time each potential and installed application. For example, in one embodiment, the exposure determination may be executed at a user preferred time, similar to running a virus scan. In a further embodiment, when the entirety of the device is under consideration, a ranked list of the potential exposure risks is generated. Thus, if multiple applications have a risk of personal exposure, they can be ordered or ranked based on various factors. An embodiment may rank the applications based on, for example, the information type that may be exposed. For example, a user's salary or tax information may be considered a higher risk than a user's typical lunch spot.

In a further embodiment, the ranked list may be generated and ordered based on some user preference. For example, although some information might be considered more sensitive overall, a user can set particular factors as more sensitive. For example, if a user has a strong desire to protect his or her friends and family from the risks associated with information collection, they may place a higher value on potential information exposure related to his or her contacts. In another embodiment, the ranked list may be generated and ordered based on learned user preference. For example, as solutions are offered to a user, an embodiment may monitor the user's typical response to a particular suggestion. If, for example, the user never takes action to correct an exposure risk regarding his or her location, an embodiment may infer that the user does not consider disclosure of their current location to be a high risk information exposure.

In an additional embodiment, the ranked list may be ordered based on the application type. For example, an embodiment may consider a banking application (which likely has access to sensitive personal information already) to be less of a threat than a social media application. In a further embodiment, the ranked list may be ordered based on the privacy level settings as discussed herein. Once the ranked list is determined, an embodiment may display the ranked list on a display device so that the user may view the most critical exposure risks at a quick glance.

In a further embodiment, the proposed solution list may be ranked based on the effectiveness of the solution and/or the level of vulnerability of the risk. For example, in one embodiment it may be possible that resolving an issue associated with a particular application would remedy multiple other issues with various other applications. By way of non-limiting example, if a user corrects all of the potential exposure risk associated with his or her text messaging application, it may also correct a risk associated with a social media application. Thus, an embodiment may generate a high priority or short list of applications to be resolved, in order to resolve all the potential information leaks posed by all the applications. This may simply the process for a user by removing various additional steps (e.g., resolving other application issues). Thus, an embodiment may display the proposed solution in a ranked list in order of effectiveness.

As discussed, an embodiment may analyze the exposure risk of applications in a variety of ways. One of the discussed ways is to execute a full scan of the device, including each application installed on the device. Based on the results, an embodiment may provide a visual indicator for a user regarding applications that pose a risk and applications that are deemed safe. Turning briefly to FIG. 2, a graphical user interface 201 is shown. As is typical of a mobile device (e.g., smartphone, tablet, etc.), a user may access an application drawer or display screen such as that shown at 201. An embodiment may then display a portion of the user's applications (e.g., App 1 through App 12 as shown at 202) with visual indicators regarding the potential for information exposure.

As a non-limiting example, an embodiment may display a check mark associated with a specific application (e.g., "APP 1" at 203 to indicate that an application is safe). Alternatively, an embodiment may display an "x" or square symbol at 204 indicating an application (e.g., "APP 5") is a risk for information exposure. As discussed herein, the determination that an application is a risk or not may be based on a predetermined privacy threshold. The predetermined threshold may be further based on a wide variety of factors, as discussed at herein. In a further embodiment, the visual indicators may be adjusted in real-time (e.g., if the permissions of an installed application change during an update, etc.). Therefore, a user may not be required to execute an application to check for potential leaks.

Accordingly, an embodiment identifies and dynamically updates a personalized user-centric privacy leak inference list and risk-score for each of the applications installed on a user's mobile device by leveraging and analyzing the dynamicity of information stored/modified/deleted on the mobile device. For example, application "X" for user "A" may be risk free whereas the same application could be highly risky in user "B's" device. This is because the information stored in user B's device may be different from that stored in user A's. In an additional embodiment, the degree of risk is also personalized for every user based on his or her past preferences or preferred settings.

An embodiment may determine a user's past preferences by constructing a personalized user-centric privacy leak inference list. In one embodiment, the list may be created via deriving confidential information leaked by the application which is inferred by analyzing user's information stored on a mobile device during application installation. An embodiment may then map the application's required permissions to a generic privacy leak inference list. This inference list is may not be user centric, and may be instead general based on the guideline defined offline.

An embodiment may then correlate the generic information inferences with the user information stored in the device to derive a personalized user-centric privacy leak inference list. Once a list is generated, an embodiment may assign a risk score for each application, via prioritizing the confidential inferred information, based on user profile/history. Moreover, using the user's past actions and/or history, an embodiment may determine the criticality of the confidential information inferred with respect to each specific user, thereby learning a user's desired importance as it relates to each type of leaked information.

A further embodiment may dynamically update the risk score of the application based on the above discussed information and changes in the mobile device. An embodiment may then intuitively display safe/unsafe signals as tags overlaid on the application icons (such as that in FIG. 2). In one embodiment, if the application information changes (addition and/or deletion) in the mobile device, the user centric risk score of the application changes at run-time. For example, if a user deletes a large number of text messages, the information exposure risk of one or more applications may be reduced. Thus, an embodiment may track any changes to existing applications and update the status (e.g., modify the visual icon) as necessary.

Because most application icons are displayed in a centralized location (e.g., app drawer, home screen, etc.) an embodiment provides an overall view of the risk status of all installed applications. One embodiment may also suggest user centric corrective steps to prevent the inferred leaks, such as, for example, ignore warnings (e.g., install the application without modification), cancel install, cancel the install and suggest alternative applications that have the same features and less risk associated with them, modification of data (e.g., deleting the data, encrypting the data, allowing application selective encryption of the data, etc.). A further embodiment may determine the smallest or easiest resolution regarding all of the installed applications. For example, if a single piece of user data is accessible by a large number of applications, an embodiment may recommend modifying the single piece of user information and then performing additional inference determinations.

Figure 3:
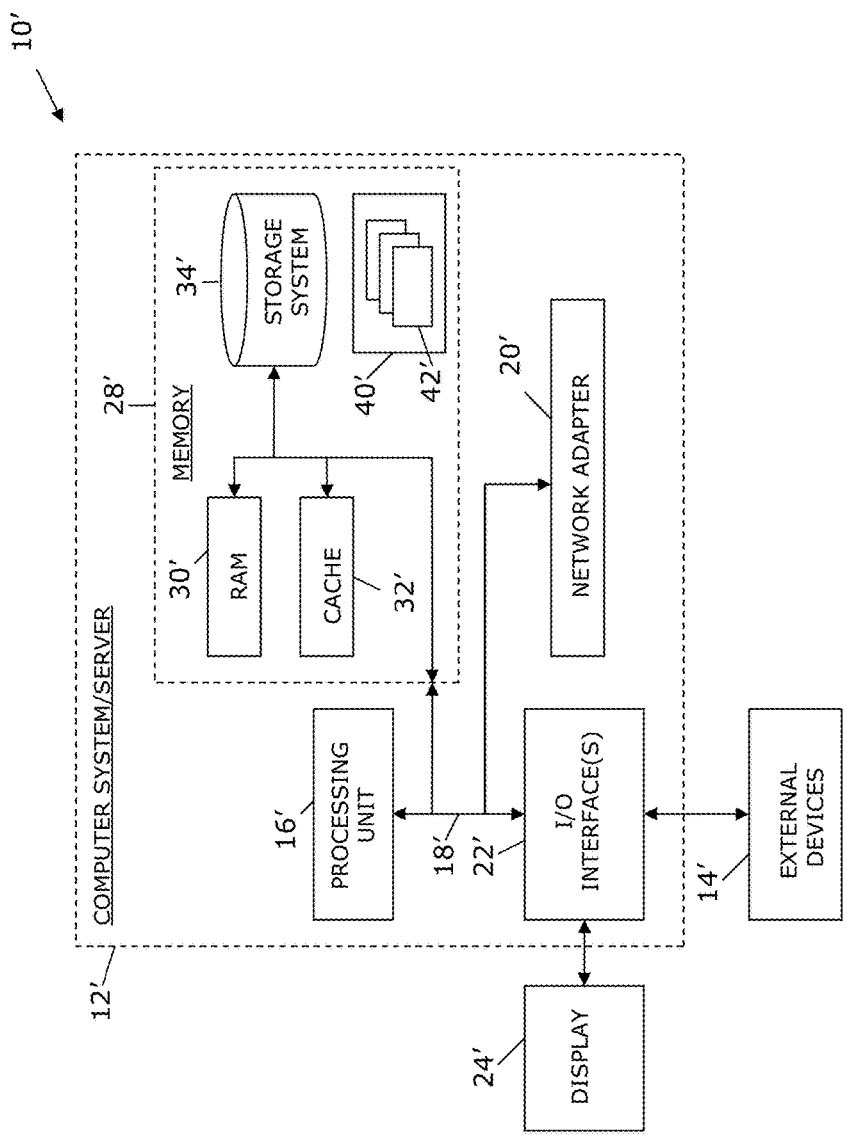
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   utilizing at least one processor to execute computer code that performs the steps of:
   identifying one or more access permissions of an application associated with an electronic device;
   identifying, based on the one or more access permissions, information accessible to the application from each of the one or more access permissions;
   analyzing the information to determine whether the information corresponds to high privacy information, wherein the analyzing comprises cross referencing the information from each of the one or more access permissions with one another to identify whether a combination of cross referenced information is associated with the high privacy information;
   determining, responsive to determining that the information corresponds to high privacy information via the cross-referencing, at least one personal exposure risk; and
   providing to a user, based on the at least one information exposure risk, a visual indication that the application is associated with at least one personal exposure risk.

2. The method of claim 1, wherein said determining at least one exposure risk is based on a privacy level.

3. The method of claim 2, wherein the privacy level is at least one of: user adjustable and based on at least one setting on the electronic device.

4. The method of claim 1, further comprising, generating a ranked list of the at least one exposure risk based on at least one of: information type, user preference, application type, and privacy level settings.

5. The method of claim 4, further comprising: displaying, on a display device, the ranked list.

6. The method of claim 1, further comprising providing, based on the determining, at least one proposed solution, wherein the at least one proposed solution comprises, at least one of: cancel application installation, modify application installation, modify contact information, modify user specific information, and create decoy information.

7. The method of claim 1, further comprising providing, based on the determining, at least one proposed solution, wherein the at least one proposed solution comprises a plurality of proposed solutions; and
wherein the proposed solutions are ranked in order of effectiveness.

8. The method of claim 1, further comprising:
dynamically identifying risks associated with specific applications based on a factor selected from the group consisting of: the analyzed user information and user input; and
notifying a user of the identified risks associated with each specific application.

9. The method of claim 8, wherein the notifying comprises, displaying, on a display device, visual indicators identifying one or more applications having an exposure risk above a predetermined threshold.

10. An apparatus comprising:
at least one processor; and
a non-transitory computer readable storage medium having computer readable program code embodied therewith and executable by the at least one processor, the computer readable program code comprising:
computer readable program code that identifies one or more access permissions of an application installed on an electronic device;
computer readable program code that identifies, based on the one or more access permissions, information accessible to the application from each of the one or more access permissions;
computer readable program code that analyzes the information to determine whether the information corresponds to high privacy information, wherein the analyzing comprises cross referencing the information from each of the one or more access permissions with one another to identify whether a combination of cross referenced information is associated with the high privacy information;
computer readable program code that determines, responsive to determining that the information corresponds to high privacy information via the cross-referencing, at least one personal exposure risk; and
computer readable program code that provides to a user, based on the at least one information exposure risk, a visual indication that the application is associated with at least one personal exposure risk.

11. A computer program product comprising:
a non-transitory computer readable storage medium having computer readable program code embodied therewith, the computer readable program code comprising:
computer readable program code that identifies one or more access permissions of an application installed on an electronic device;
computer readable program code that identifies, based on the one or more access permissions, information accessible to the application from each of the one or more access permissions;
computer readable program code that analyzes the information to determine whether the information corresponds to high privacy information, wherein the analyzing comprises cross referencing the information from each of the one or more access permissions with one another to identify whether a combination of cross referenced information is associated with the high privacy information;
computer readable program code that determines, responsive to determining that the information corresponds to high privacy information via the cross-referencing, at least one personal exposure risk; and
computer readable program code that provides to a user, based on the at least one information exposure risk, a visual indication that the application is associated with at least one personal exposure risk.

12. The computer program product of claim 11, wherein said determination of at least one exposure risk is based on a privacy level.

13. The computer program product of claim 12, wherein the privacy level is at least one of: user adjustable and based on at least one setting on the electronic device.

14. The computer program product of claim 11, further comprising, computer readable program code that generates a ranked list of the at least one exposure risk based on at least one of: information type, user preference, application type, and privacy level settings.

15. The computer program product of claim 14, further comprising: computer readable program code that displays, on a display device, the ranked list.

16. The computer program product of claim 11, further comprising providing, based on the determining, at least one proposed solution, wherein the proposed solution comprises, at least one of: cancel application installation, modify application installation, modify contact information, modify user specific information, and create decoy information.

17. The computer program product of claim 11, further comprising providing, based on the determining, at least one proposed solution, wherein the at least one proposed solution comprises a plurality of proposed solutions; and
wherein the proposed solutions are ranked in order of effectiveness.

18. The computer program product of claim 11, further comprising:
computer readable program code that identifies risks associated with specific applications based on the analyzed user information; and
computer readable program code that notifies a user of the identified risks associated with each specific application.

19. The computer program product of claim 18, wherein the notification comprises, displaying, on a display device, visual indicators, identifying one or more applications having an exposure risk above a predetermined threshold.

20. A method comprising:
identifying at least two applications installed on an electronic device that share a commonality;
identifying access permissions of the at least two applications;
identifying, based on the one or more access permissions, information accessible to the application from each of the one or more access permissions;

analyzing the information to determine whether the information corresponds to high privacy information, wherein the analyzing comprises cross referencing the information from each of the one or more access permissions with one another to identify whether a combination of information is associated with the high privacy information;

determining, based on the permissions of the at least two applications, at least one information exposure risk, wherein the determining comprises identifying, by accessing privacy level settings associated with the electronic device, whether the access permissions provide access to high privacy information via the cross-referencing; and providing to a user, based on the at least one information exposure risk, a visual indication regarding whether the at least two applications are associated with the at least one information exposure risk.

\* \* \* \* \*